US012757201B2

(12) United States Patent
Fu

(10) Patent No.: US 12,757,201 B2
(45) Date of Patent: Oct. 6, 2026

(54) SCHEDULING REQUEST PROCESS PROCESSING METHOD AND APPARATUS, DEVICE, AND STORAGE MEDIUM

(71) Applicant: Beijing Xiaomi Mobile Software Co., Ltd., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 215 days.

(21) Appl. No.: 18/837,083

(22) PCT Filed: Feb. 25, 2022

(86) PCT No.: PCT/CN2022/078081
§ 371 (c)(1),
(2) Date: Aug. 8, 2024

(87) PCT Pub. No.: WO2023/159515
PCT Pub. Date: Aug. 31, 2023

(65) Prior Publication Data

US 2025/0151057 A1 May 8, 2025

(51) Int. Cl.
*H04W 76/38* (2018.01)
*H04W 72/1273* (2023.01)

(52) U.S. Cl.
CPC ....... *H04W 72/1273* (2013.01); *H04W 76/38* (2018.02)

(58) Field of Classification Search
CPC . H04W 72/1273; H04W 76/38; H04W 72/21; H04W 72/23; Y02D 30/70
See application file for complete search history.

(56) References Cited

U.S. PATENT DOCUMENTS

| | | | | |
|---|---|---|---|---|
| 2020/0236582 | A1 | 7/2020 | Chin et al. | |
| 2021/0243741 | A1* | 8/2021 | Lin | H04W 76/28 |
| 2021/0320821 | A1* | 10/2021 | Lee | H04L 25/0204 |
| 2021/0360667 | A1* | 11/2021 | Moon | H04L 5/0035 |
| 2021/0360733 | A1* | 11/2021 | Bao | H04W 76/28 |
| 2022/0104132 | A1* | 3/2022 | Wu | H04W 52/0232 |
| 2022/0201516 | A1* | 6/2022 | Guo | H04W 24/08 |
| 2022/0224476 | A1* | 7/2022 | Noh | H04L 5/0048 |
| 2022/0330215 | A1* | 10/2022 | Lai | H04L 5/0053 |
| 2023/0362954 | A1* | 11/2023 | Moon | H04W 72/0446 |
| 2024/0107556 | A1* | 3/2024 | Ma | H04W 24/02 |

(Continued)

FOREIGN PATENT DOCUMENTS

| | | |
|---|---|---|
| CN | 111277381 A | 6/2020 |
| CN | 111972026 A | 11/2020 |

(Continued)

*Primary Examiner* — Syed Ali
(74) *Attorney, Agent, or Firm* — McCoy Russell LLP

(57) ABSTRACT

A method, an apparatus, a device, and a storage medium for a scheduling request (SR) process processing are provided. The method includes: receiving a PDCCH monitoring adaptive indication sent by a network device; and canceling a pending SR in a case that there is a pending of the SR and the received PDCCH monitoring adaptive indication carries first indication information. Solutions are provided for how the SR process should be processed after a terminal device receives the PDCCH monitoring adaptive indication sent by the network device.

15 Claims, 4 Drawing Sheets

(56) References Cited

U.S. PATENT DOCUMENTS

| | | | | |
|---|---|---|---|---|
| 2024/0276520 | A1* | 8/2024 | Huang .............. | H04W 72/1273 |
| 2025/0227809 | A1* | 7/2025 | Luo ................... | H04W 52/0216 |

FOREIGN PATENT DOCUMENTS

| | | | |
|---|---|---|---|
| CN | 112954733 | A | 6/2021 |
| CN | 113597812 | A | 11/2021 |
| CN | 113923761 | A | 1/2022 |
| CN | 113939025 | A | 1/2022 |

* cited by examiner

SCHEDULING REQUEST PROCESS PROCESSING METHOD AND APPARATUS, DEVICE, AND STORAGE MEDIUM

CROSS-REFERENCE OF RELATED APPLICATION

The present application is a U.S. National Stage of International Application No. PCT/CN2022/078081, filed on Feb. 25, 2022, the contents of all of which are incorporated herein by reference in their entireties for all purposes.

BACKGROUND

When a terminal device needs to send uplink data, the terminal device sends a scheduling request (SR) to a network device, and the SR is used for requesting uplink resources which are used for the terminal device to send the uplink data.

SUMMARY

The disclosure relates to the field of communications. Examples of the disclosure provide a method, an apparatus, a device, and a storage medium for scheduling request process processing.

According to one aspect of the examples of the disclosure, a method for scheduling request process processing is provided, which is applied to a terminal device and includes:

receiving a physical downlink control channel (PDCCH) monitoring adaptive indication sent by a network device; and canceling a pending SR in a case that there is a pending of the SR and the received PDCCH monitoring adaptive indication carries first indication information.

According to one aspect of the examples of the disclosure, a method for scheduling request process processing is provided, which is applied to a network device and includes:

sending a PDCCH monitoring adaptive indication to a terminal device to enable the terminal device to cancel a pending SR in a case that there is a pending of the SR and the received PDCCH monitoring adaptive indication carries first indication information.

According to another aspect of the examples of the disclosure, an apparatus for scheduling request process processing is provided, and the apparatus includes: a receiving module and a processing module;

the receiving module is configured to receive a PDCCH monitoring adaptive indication sent by a network device; and the processing module is configured to cancel a pending SR in a case that there is a pending of the SR and the received PDCCH monitoring adaptive indication carries first indication information.

According to another aspect of the examples of the disclosure, an apparatus for scheduling request process processing is provided, and the apparatus includes: a sending module; and the sending module is configured to send a PDCCH monitoring adaptive indication to a terminal device to enable the terminal device to cancel a pending SR in a case that there is a pending of the SR and the received PDCCH monitoring adaptive indication carries first indication information.

According to another aspect of the examples of the disclosure, a terminal device is provided, and the terminal device includes: a processor; and a transceiver connected with the processor, where the processor is configured to load and execute executable instructions to implement the scheduling request process processing method as described in the above aspects.

According to another aspect of the examples of the disclosure, a network device is provided, and the network device includes: a processor; and a transceiver connected with the processor, where the processor is configured to load and execute executable instructions to implement the scheduling request process processing method as described in the above aspects.

According to another aspect of the examples of the disclosure, a non-transitory computer-readable storage medium is provided, the non-transitory computer-readable storage medium stores at least one instruction, at least one program, a code set or an instruction set, and the at least one instruction, the at least one program, the code set or the instruction set is loaded and executed by a processor to implement the scheduling request process processing method as described in the above aspects.

According to another aspect of the examples of the disclosure, a chip is provided, the chip includes a programmable logic circuit and/or a program instruction, and the chip, when operating, is configured to implement the scheduling request process processing method as described in the above aspects.

According to another aspect of the examples of the disclosure, a computer program product (or a computer program) is provided, the computer program product (or the computer program) includes computer instructions, and the computer instructions are stored in a non-transitory computer-readable storage medium; and a processor of a computer device reads the computer instructions from the non-transitory computer-readable storage medium, and the processor executes the computer instructions to cause the computer device to execute the scheduling request process processing method as described in the above aspects.

It is to be understood that the above general descriptions and later detailed descriptions are merely exemplary and illustrative, and cannot limit the disclosure.

BRIEF DESCRIPTION OF DRAWINGS

In order to explain the examples of the disclosure more clearly, the accompanying drawings that need to be used in the description of the examples will be briefly introduced below. Apparently, the accompanying drawings in the following description are merely some examples of the disclosure, and for those of ordinary skill in the art, other accompanying drawings can also be derived according to these accompanying drawings without the need for creative labor.

DETAILED DESCRIPTION OF THE INVENTION

Examples will be described in detail here, and instances of the examples are shown in the accompanying drawings. When the following description refers to the accompanying drawings, unless otherwise indicated, the same numbers in different accompanying drawings indicate the same or similar elements. The embodiments described in the following examples do not represent all embodiments consistent with the disclosure. Rather, they are merely instances of apparatuses and methods consistent with some aspects of the disclosure as detailed in the appended claims.

First, some terms involved in the disclosure are briefly introduced:

PDCCH Monitoring Adaptation

A PDCCH monitoring adaptation scheme is proposed in an R17 power saving project, that is: a bitfield containing N bits in scheduling DCI is adopted to indicate a PDCCH monitoring adaptation behavior.

After a terminal device receives a PDCCH monitoring adaptive indication (namely the above DCI), the terminal device may adopt one of the following behaviors:

behavior 1: not to activate PDCCH skipping.

behavior 1A: to stop PDCCH monitoring (namely PDCCH skipping) within a duration X. A network device may dynamically indicate a value of X in the DCI.

Behavior 2: to stop monitoring search spaces in SSSG #1 and SSSG #2 (if configured), and to monitor a search space in SSSG #0.

Behavior 2A: to stop monitoring search spaces in SSSG #0 and SSSG #2 (if configured), and to monitor a search space in SSSG #1.

Behavior 2B: to stop monitoring search spaces in SSSG #0 and SSSG #1, and to monitor a search space in SSSG #2 (if configured).

Canceling of a Pending SR

In the related art, there are the following two reasons defined for canceling a pending SR:

(1) a terminal device sends a medium access control (MAC) protocol data unit (PDU) containing a buffer state report (BSR), and then an SR pending before the assembly of the MAC PDU may be canceled.

(2) The terminal device receives an uplink scheduling instruction and transmission requirements of all pending uplink data can be met, and then a pending SR may be canceled.

No solution is provided in the related art for how an SR process should be processed after the terminal device receives a PDCCH monitoring adaptive indication sent by a network device if an SR is still in a pending state after the terminal device sends the SR.

In the following, solutions provided by examples of the disclosure will be explained.

Figure 1:
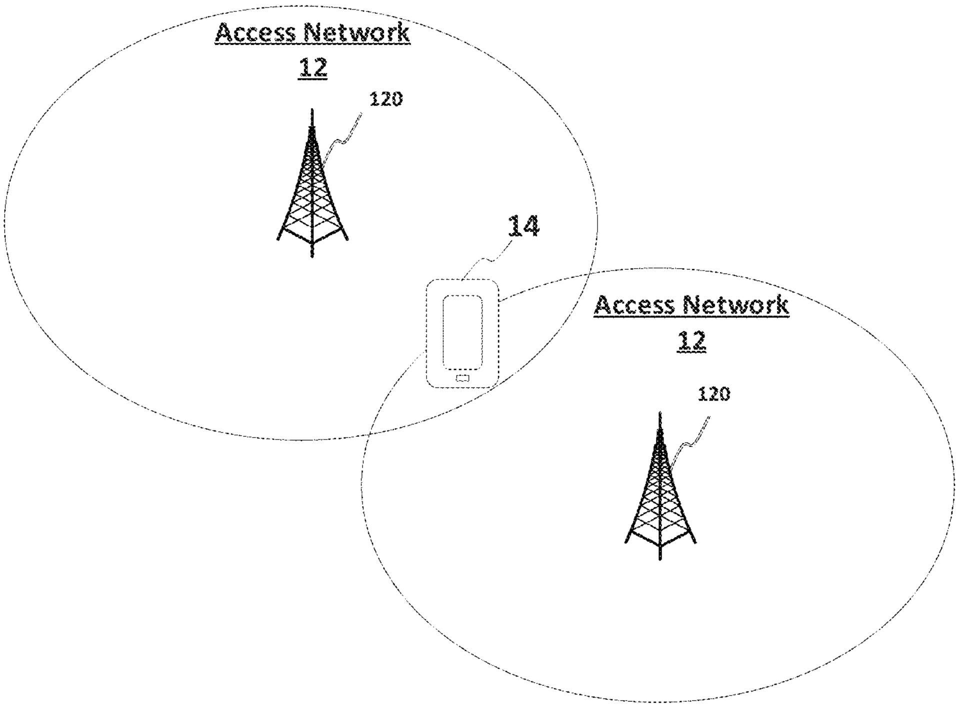
FIG. 1 is a block diagram of a communication system according to an example.

FIG. 1 shows a block diagram of a communication system provided by an example of the disclosure. The communication system may include: an access network 12 and a terminal device 14.

The access network 12 includes a plurality of access network devices 120. The access network devices 120 may be base stations, and the base stations are apparatuses deployed in the access network to provide a wireless communication function for the terminal device (for short, "terminal") 14. The base stations may include various forms of macro base stations, micro base stations, relay stations, access points, etc. In the systems adopting different wireless access techniques, devices having a base station function may be different by name, for example, in a long-term evolution (LTE) system, the device is called eNodeB or eNB; and in a 5G new radio (NR) system, the device is called gNodeB or gNB. With the evolution of communication techniques, such description "base station" may vary. For the convenience of descriptions in examples of the disclosure, the above apparatuses providing the wireless communication function for the terminal device 14 are collectively referred to as a network device.

The terminal device 14 may include various handheld devices, vehicle-mounted devices, wearable devices, computing devices or other processing devices, connected to wireless modems, with the wireless communication function, as well as various forms of user equipment, mobile stations (MS), terminal devices, etc. For the convenience of description, the above-mentioned devices are collectively referred to as the terminal device. The access network device 120 and the terminal device 14 communicate with each other through a certain radio technique, such as a Uu interface.

The examples of the disclosure may be applied to various communication systems, such as: a global system of mobile communication (GSM), a code division multiple access (CDMA) system, a wideband code division multiple access (WCDMA) system, a general packet radio service (GPRS), a long-term evolution (LTE) system, an LTE frequency division duplex (FDD) system, an LTE time division duplex (TDD) system, an advanced long-term evolution (LTE-A) system, a new radio (NR) system, an evolution system of an NR system, an LTE-based access to unlicensed spectrum (LTE-U) system, an NR-U system, a universal mobile telecommunication system (UMTS), a worldwide interoperability for microwave access (WiMAX) communication system, wireless local area networks (WLANs), wireless fidelity (WiFi), the next generation communication system or other communication systems.

In general, traditional communication systems support limited number of connections and are easy to implement. However, with the development of communication techniques, a mobile communication system will not only support traditional communication, but also, for example, device to device (D2D) communication, machine to machine (M2M) communication, machine type communication (MTC), vehicle to vehicle (V2V) communication, a vehicle to everything (V2X) system, etc. The examples of the disclosure may also be applied to these communication systems.

Figure 2:
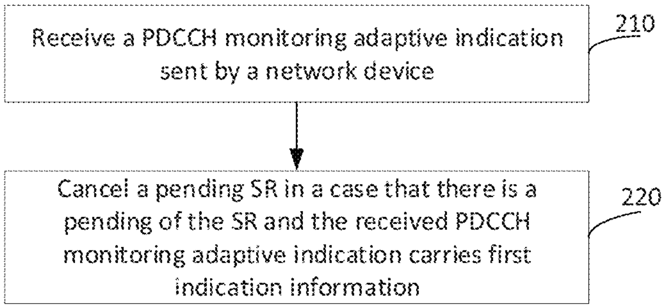
FIG. 2 is a flow diagram of a method for scheduling request process processing according to an example.

FIG. 2 shows a flow diagram of a method for scheduling request process processing provided by an example of the disclosure, which is applied to the terminal device in the communication system shown in FIG. 1, and the method includes:

step 210: a PDCCH monitoring adaptive indication sent by a network device is received by the terminal device.

The network device may send the PDCCH monitoring adaptive indication to the terminal device. Correspondingly, the terminal device receives the PDCCH monitoring adaptive indication sent by the network device.

The PDCCH monitoring adaptive indication is sent by the network device to the terminal device to indicate information of PDCCH monitoring adjustment.

Step 220: a pending SR is canceled by the terminal device in a case that there is a pending of the SR and the received PDCCH monitoring adaptive indication carries first indication information.

In the example of the disclosure, the terminal device is executing a scheduling request process which is a process of requesting uplink resources by sending an SR, and a current progress is that: the terminal device has sent the SR to the network device, the SR is in a pending state, and there are pending data to be transmitted at the terminal device.

The pending state is a state in which the SR has not been canceled yet after being triggered.

In a case that there is a pending SR, and the terminal device receives the PDCCH monitoring adaptive indication sent by the network device, the pending SR is canceled by the terminal device in a case that the received PDCCH monitoring adaptive indication carries the first indication information. That is, the pending SR is canceled by the terminal device in a case that there is a pending of the SR and the PDCCH monitoring adaptive indication containing the first indication information is received.

It is understood that when the terminal device executes the scheduling request process and requests the uplink resources by sending the SR, the SR is in a pending state after the terminal device sent the SR, the terminal device needs to monitor the PDCCH to confirm whether the network device responds to the SR. As the terminal device receives the PDCCH monitoring adaptive indication subsequently and the PDCCH monitoring adaptive indication is used to indicate a PDCCH monitoring adjustment, the received PDCCH monitoring adaptive indication will have an influence on the behavior of the terminal device in confirming whether the network device responds to the SR.

The first indication information is the information carried in the PDCCH monitoring adaptive indication.

In the example of the disclosure, the first indication information is the information that makes the terminal device believe that the SR is difficult to meet. Thus, the terminal device cancels the pending SR and ends the current scheduling request process. The SR being difficult to meet may also be understood as that: there is no need to continue the pending of the SR, the scheduling request process fails, and the like.

In conclusion, in the method for scheduling request process processing provided by the present example, in a case that there is a pending SR, and the terminal device receives the PDCCH monitoring adaptive indication sent by the network device, and in a case that the received PDCCH monitoring adaptive indication carries the first indication information, as the first indication information makes the terminal device believe that the SR is difficult to meet, the terminal device cancels the pending SR, thus avoiding the waste of storage and computing resources of the terminal device due to unnecessary continuous pending of SRs at the terminal device.

In a possible embodiment, the first indication information includes: information indicating PDCCH skipping.

Figure 3:
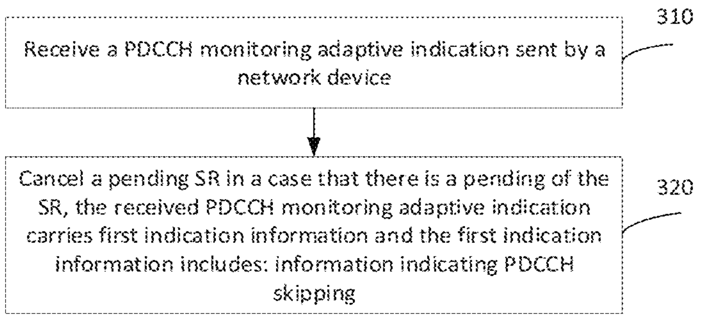
FIG. 3 is a flow diagram of a method for scheduling request process processing according to another example.

FIG. 3 shows a flow diagram of a method for scheduling request process processing provided by an example of the disclosure, which is applied to the terminal device in the communication system shown in FIG. 1, and the method includes:

step 310: a PDCCH monitoring adaptive indication sent by a network device is received by the terminal device.

In some embodiments, the PDCCH monitoring adaptive indication may be sent to the terminal device by the network device, and correspondingly, the PDCCH monitoring adaptive indication sent by the network device may be received by the terminal device.

The PDCCH monitoring adaptive indication is sent by the network device to the terminal device to indicate information of PDCCH monitoring adjustment.

Optionally, the PDCCH monitoring adaptive indication is carried in scheduling DCI. For example, the scheduling DCI includes a bitfield containing N bits, and the bitfield is used to indicate the PDCCH monitoring adaptive indication.

The scheduling DCI is the DCI used for downlink scheduling.

That is, the PDCCH monitoring adaptive indication is carried in the DCI used for downlink scheduling.

The scheduling DCI is the DCI used for uplink scheduling.

That is, the PDCCH monitoring adaptive indication is carried in the DCI used for uplink scheduling.

For example, the uplink scheduling here cannot meet the transmission requirements of all the pending data to be transmitted corresponding to the SR.

The transmission requirements may include requirements related to the following aspects:

(1) the quantity of the resources allocated by the uplink scheduling is not enough for the transmission of all the pending data to be transmitted; and (2) features of the resources allocated by the uplink scheduling cannot meet the quality of service (QOS) requirements for all the pending data to be transmitted.

For example, some pending data to be transmitted on certain logic channels require the time domain length of a mapped physical layer resource physical uplink shared channel (PUSCH) to be 4 time domain symbols at maximum. If the time domain length of a PUSCH allocated by an uplink scheduling is 8 symbols, the resources allocated by the uplink scheduling cannot fulfill the transmission of pending data on the logic channel.

Step 320: a pending SR is canceled by the terminal device in a case that there is a pending of the SR, and the received PDCCH monitoring adaptive indication carries first indication information and the first indication information includes: information indicating PDCCH skipping.

The information indicating PDCCH skipping (i.e., a PDCCH skipping indication) refers to the information that indicates the terminal device does not execute PDCCH monitoring within a certain period of time.

It is understood that when the terminal device executes a scheduling request process and requests the uplink resources by sending the SR, the SR is in a pending state after the terminal device sent the SR, the terminal device needs to monitor the PDCCH to confirm whether the network device responds to the SR. As the terminal device receives the PDCCH monitoring adaptive indication subsequently and the PDCCH monitoring adaptive indication carries the first indication information, the first indication information includes: the information indicating PDCCH skipping, the terminal device will not execute PDCCH monitoring within a period of time based on the first indication information, if the SR continues to be in the pending state, the terminal device cannot confirm whether the network device responds to the SR, thus the terminal device cancels the pending SR.

Optionally, the information indicating PDCCH skipping carries a skip duration and the skip duration exceeds a first duration, where the skip duration is a duration in which a PDCCH is not monitored. Optionally, the PDCCH contains a Type 3 common search space and a UE-specific search space.

That is, the skip duration indicated by the information indicating PDCCH skipping is greater than or equal to (or greater than) the first duration.

For example, the first duration is a time threshold calculated by the terminal device based on the configurations at the network device side. The above configurations may be configurations related to the SR.

If the skip duration is less than the first duration, that is, the duration during which the terminal device skips the PDCCH monitoring is short, the terminal device may continue to monitor the DCI used for uplink scheduling after the skip duration. The SR does not need to be canceled within this short skip duration.

If the skip duration is greater than the first duration, that is, the duration during which the terminal device skips the PDCCH monitoring is long, the terminal device will not be able to obtain the DCI used for uplink scheduling within the skip duration, that is, the scheduling request cannot be met within this long duration, the SR may be canceled.

In the following, the first duration will be further explained.

The first duration is a duration determined according to a scheduling request-prohibit timer (sr-ProhibitTimer) configured by the network device.

For example, the first duration=sr-ProhibitTimer.

The sr-ProhibitTimer is a timer at the terminal device side, the duration of which is configured by the network device. The network device may configure one sr-ProhibitTimer for each SR configuration. As for each SR configuration, after the terminal device sends the SR, it is prohibited to send an SR again within the sr-ProhibitTimer duration.

Optionally, in a case that the network device configures a plurality of sr-ProhibitTimer, the first duration is a duration determined according to a maximum value of the plurality of sr-ProhibitTimer.

For example, the first duration=the maximum value of sr-ProhibitTimer.

The first duration is a duration determined according to the sr-ProhibitTimer and a scheduling request-transmission maximum value (sr-TransMax) configured by the network device.

For example, the first duration=sr-ProhibitTimer*sr-TransMax.

The sr-TransMax is a maximum number of times that the terminal device may repeatedly initiate an SR. The network device may configure one sr-TransMax for each SR configuration. If the terminal device does not receive a response from the network device after the maximum number of times of repeated transmission is exceeded, it is believed that a beam or a link failure occurs.

Optionally, in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

For example, the first duration=the maximum value of sr-ProhibitTimer*the maximum value of sr-TransMax.

In conclusion, in the method for scheduling request process processing provided by the present example, in a case that there is a pending SR, and the terminal device receives the PDCCH monitoring adaptive indication sent by the network device, and in a case that the received PDCCH monitoring adaptive indication carries the first indication information, as the first indication information includes the information indicating PDCCH skipping and makes the terminal device believe that the SR is difficult to meet, the terminal device cancels the pending SR, thus avoiding the waste of storage and computing resources of the terminal device due to unnecessary continuous pending of SRs at the terminal device.

In another possible embodiment, the first indication information includes: information indicating switching to an empty search space set group (SSSG).

Figure 4:
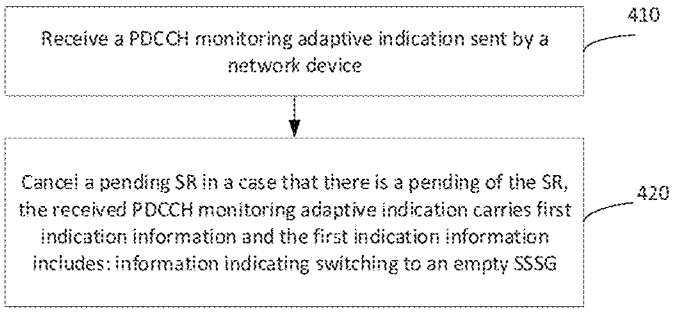
FIG. 4 is a flow diagram of a method for scheduling request process processing according to another example.

FIG. 4 shows a flow diagram of a method for scheduling request process processing provided by an example of the disclosure, which is applied to the terminal device in the communication system shown in FIG. 1, and the method includes:

step 410: a PDCCH monitoring adaptive indication sent by a network device is received by the terminal device.

In some embodiments, the PDCCH monitoring adaptive indication may be sent to the terminal device by the network device may. Correspondingly, the PDCCH monitoring adaptive indication sent by the network device may be received the terminal device.

The PDCCH monitoring adaptive indication is sent by the network device to the terminal device to indicate information of PDCCH monitoring adjustment.

Optionally, the PDCCH monitoring adaptive indication is carried in scheduling DCI. For example, the scheduling DCI includes a bitfield containing N bits, and the bit field is used to indicate the PDCCH monitoring adaptive indication.

The scheduling DCI is the DCI used for downlink scheduling.

That is, the PDCCH monitoring adaptive indication is carried in the DCI used for downlink scheduling.

The scheduling DCI is the DCI used for uplink scheduling.

That is, the PDCCH monitoring adaptive indication is carried in the DCI used for uplink scheduling.

For example, the uplink scheduling here cannot meet the transmission requirements of all the pending data to be transmitted corresponding to the SR.

The transmission requirements may include requirements related to the following aspects:

(1) the quantity of the resources allocated by the uplink scheduling is not enough for the transmission of all the pending data to be transmitted; and (2) features of the resources allocated by the uplink scheduling cannot meet the QoS requirements for all the pending data to be transmitted.

For example, some pending data to be transmitted on certain logic channels require the maximum time domain length of a mapped physical layer resource PUSCH to be 4 time domain symbols at maximum. If the time domain length of a PUSCH allocated by an uplink scheduling is 8 symbols, the resources allocated by the uplink scheduling cannot fulfill the transmission of pending data on the logic channel.

Step 420: a pending SR is canceled by the terminal device in a case that there is a pending of the SR, and the received PDCCH monitoring adaptive indication carries first indication information and the first indication information includes: information indicating switching to an empty SSSG.

The information indicating switching to the empty SSSG refers to the information that indicates switching of the terminal device to an SSSG to monitor a search space in the SSSG, the SSSG not containing any search space and being an empty SSSG.

It is understood that when the terminal device executes a scheduling request process and requests the uplink resources by sending the SR, the SR is in a pending state after the terminal device has sent the SR, the terminal device needs to monitor the PDCCH, i.e., detecting, in a search space, whether the network device sends a PDCCH to the terminal device, to confirm whether the network device responds to the SR. As the terminal device receives the PDCCH monitoring adaptive indication subsequently and the PDCCH monitoring adaptive indication carries the first indication information, the first indication information includes: the information indicating switching to the empty SSSG, the terminal device will be switched to the empty SSSG not containing any search space based on the first indication information, if the SR continues to be in the pending state, the terminal device cannot confirm whether the network device responds to the SR, thus the terminal device cancels the pending SR.

Optionally, the information indicating switching to the empty SSSG carries a timing value and the timing value exceeds a first duration, where the timing value is a duration of switching to the empty SSSG.

That is, the timing value of the information indicating switching to the empty SSSG is greater than or equal to (or greater than) the first duration.

For example, the first duration is a time threshold calculated by the terminal device based on the configurations at the network device side. The above configurations may be configurations related to the SR.

If the timing value is less than the first duration, that is, the duration during which the terminal device is switched to the empty SSSG and cannot monitor the PDCCH is short, the terminal device may continue to monitor the DCI used for uplink scheduling after the timing value. The SR does not need to be canceled within this short timing value.

If the timing value is greater than the first duration, that is, the duration during which the terminal device is switched to the empty SSSG and cannot monitor the PDCCH is long, the terminal device will not be able to obtain the DCI used for uplink scheduling within the timing value, that is, the scheduling request cannot be met within this long time period, the SR may be canceled.

In the following, the first duration will be further explained.

The first duration is a duration determined according to the sr-ProhibitTimer configured by the network device.

For example, the first duration=sr-ProhibitTimer.

The sr-ProhibitTimer is a timer at the terminal device side, the duration of which is configured by the network device. The network device may configure one sr-ProhibitTimer for each SR configuration. As for each SR configuration, after the terminal device sends the SR, it is prohibited to send an SR again within the sr-ProhibitTimer duration.

Optionally, in a case that the network device configures a plurality of sr-ProhibitTimer, the first duration is a duration determined according to a maximum value of the plurality of sr-ProhibitTimer.

For example, the first duration=the maximum value of sr-ProhibitTimer.

The first duration is a duration determined according to the sr-ProhibitTimer and the sr-TransMax configured by the network device.

For example, the first duration=sr-ProhibitTimer*sr-TransMax.

The sr-TransMax is a maximum number of times that the terminal device may repeatedly initiate an SR. The network device may configure one sr-TransMax for each SR configuration. If the terminal device does not receive a response from the network device after the maximum number of times of repeated transmission is exceeded, it is believed that a beam failure or a link failure occurs.

Optionally, in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

For example, the first duration=the maximum value of sr-ProhibitTimer*the maximum value of sr-TransMax.

In conclusion, in the method for scheduling request process processing provided by the present example, in a case that there is a pending SR, and the terminal device receives the PDCCH monitoring adaptive indication sent by the network device, and in a case that the received PDCCH monitoring adaptive indication carries the first indication information, as the first indication information includes the information indicating switching to the empty SSSG and makes the terminal device believe that the SR is difficult to meet, the terminal device cancels the pending SR, thus avoiding the waste of storage and computing resources of the terminal device due to unnecessary continuous pending of SRs at the terminal device.

Figure 5:
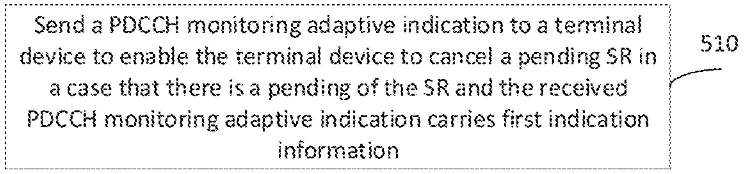
FIG. 5 is a flow diagram of a method for scheduling request process processing according to another example.

FIG. 5 shows a flow diagram of a method for scheduling request process processing provided by an example of the disclosure, which is applied to the network device in the communication system shown in FIG. 1, and the method includes:

step 510: the network device sends a PDCCH monitoring adaptive indication to a terminal device to enable the terminal device to cancel a pending SR in a case that there is a pending of the SR and the received PDCCH monitoring adaptive indication carries first indication information.

The network device may send the PDCCH monitoring adaptive indication to the terminal device. Correspondingly, the terminal device receives the PDCCH monitoring adaptive indication sent by the network device.

The PDCCH monitoring adaptive indication is sent by the network device to the terminal device to indicate information of PDCCH monitoring adjustment.

In the example of the disclosure, before the terminal device receives the PDCCH monitoring adaptive indication, the terminal device is executing a scheduling request process which is a process of requesting uplink resources by sending an SR, and a current progress is that: the terminal device has sent the SR to the network device, the SR is in a pending state, and there are pending data to be transmitted at the terminal device side.

The pending state is a state in which the SR has not been canceled yet after being triggered.

In a case that there is a pending SR, the terminal device receives the PDCCH monitoring adaptive indication sent by the network device, where the pending SR is canceled by the terminal device in a case that the received PDCCH monitoring adaptive indication carries the first indication information. That is, the pending SR is canceled by the terminal device in a case that there is a pending of the SR and the PDCCH monitoring adaptive indication containing the first indication information is received.

It can be understood that when the terminal device executes the scheduling request process and requests the uplink resources by sending the SR, the SR is in the pending state after the terminal device has sent the SR, the terminal device needs to monitor the PDCCH to confirm whether the network device responds to the SR. As the terminal device receives the PDCCH monitoring adaptive indication subsequently and the PDCCH monitoring adaptive indication is used to indicate a PDCCH monitoring adjustment, the received PDCCH monitoring adaptive indication will have an influence on the behavior of the terminal device in confirming whether the network device responds to the SR.

The first indication information is information carried in the PDCCH monitoring adaptive indication.

In the example of the disclosure, the first indication information is the information that makes the terminal device believe that the SR is difficult to meet. Thus, the terminal device cancels the pending SR and ends the current scheduling request process. The SR being difficult to meet above may also be understood as that: there is no need to continue the pending of the SR, the scheduling request process fails, and the like.

In conclusion, in the method for scheduling request process processing provided by the present example, in a case that there is a pending SR, and the terminal device receives the PDCCH monitoring adaptive indication sent by the network device, and in a case that the received PDCCH monitoring adaptive indication carries the first indication information, as the first indication information makes the terminal device believe that the SR is difficult to meet, the terminal device cancels the pending SR, thus avoiding the waste of storage and computing resources of the terminal device are wasted due to unnecessary continuous pending of SRs at the terminal device.

In a possible embodiment, the first indication information includes: information indicating PDCCH skipping.

Figure 6:
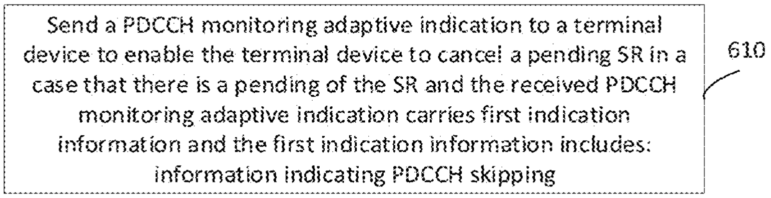
FIG. 6 is a flow diagram of a method for scheduling request process processing according to another example.

FIG. 6 shows a flow diagram of a method for scheduling request process processing provided by an example of the disclosure, which is applied to the network device in the communication system shown in FIG. 1, and the method includes:

step 610: the network device sends a PDCCH monitoring adaptive indication to a terminal device to enable the terminal device to cancel a pending SR in a case that there is a pending of the SR, and the received PDCCH monitoring adaptive indication carries first indication information and the first indication information includes: information indicating PDCCH skipping.

In some embodiments, the network device sends the PDCCH monitoring adaptive indication to the terminal device, and correspondingly, the terminal device receives the PDCCH monitoring adaptive indication sent by the network device.

The PDCCH monitoring adaptive indication is sent by the network device to the terminal device to indicate information of PDCCH monitoring adjustment.

Optionally, the PDCCH monitoring adaptive indication is carried in scheduling DCI. For example, the scheduling DCI includes a bitfield containing N bits, and the bitfield is to indicate the PDCCH monitoring adaptive indication.

The scheduling DCI is the DCI used for downlink scheduling.

That is, the PDCCH monitoring adaptive indication is carried in the DCI used for downlink scheduling.

The scheduling DCI is the DCI used for uplink scheduling.

That is, the PDCCH monitoring adaptive indication is carried in the DCI used for uplink scheduling.

For example, the uplink scheduling here cannot meet the transmission requirements of all the pending data to be transmitted corresponding to the SR.

The transmission requirements may include requirements related to the following aspects:

(1) the quantity of the resources allocated by the uplink scheduling is not enough for the transmission of all the pending data to be transmitted; and (2) features of the resources allocated by the uplink scheduling cannot meet the quality of service (QOS) requirements of all the pending data to be transmitted.

For example, some certain data to be transmitted on certain logic channels require the time domain length of a mapped physical layer resource physical uplink shared channel (PUSCH) to be 4 time domain symbols at maximum. If the time domain length of a PUSCH allocated by an uplink scheduling is 8 symbols, the resources allocated by the uplink scheduling cannot fulfill the transmission of pending data on the logic channel.

The information indicating PDCCH skipping (i.e., a PDCCH skipping indication) refers to the information that indicates the terminal device does not execute PDCCH monitoring within a certain period of time.

It can be understood that when the terminal device executes a scheduling request process and requests the uplink resources by sending the SR, the SR is in a pending state after the terminal device has sent the SR, and the terminal device needs to monitor the PDCCH monitoring to confirm whether the network device responds to the SR. As the terminal device receives the PDCCH monitoring adaptive indication subsequently and the PDCCH monitoring adaptive indication carries the first indication information, the first indication information includes: the information indicating PDCCH skipping, the terminal device will not execute PDCCH monitoring within a period of time based on the first indication information, if the SR continues to be in the pending state, the terminal device cannot confirm whether the network device responds to the SR, and thus the terminal device cancels the pending SR.

Optionally, the information indicating PDCCH skipping carries a skip duration, and the skip duration exceeds a first duration, where the skip duration is a duration in which a PDCCH is not monitored. Optionally, the PDCCH contains a Type 3 common search space and a UE-specific search space.

That is, the skip duration indicated by the information indicating PDCCH skipping is greater than or equal to (or greater than) the first duration.

For example, the first duration is a time threshold calculated by the terminal device based on configurations at the network device side. The above configurations may be configurations related to the SR.

If the skip duration is less than the first duration, that is, the duration during which the terminal device skips the PDCCH monitoring is short, the terminal device may continue to monitor the DCI used for uplink scheduling after the skip duration. The SR does not need to be canceled within this short skip duration.

If the skip duration is greater than the first duration, that is, the duration during which the terminal device skips the PDCCH monitoring long, the terminal device will not be able to obtain the DCI used for uplink scheduling within the skip duration, that is, the scheduling request cannot be met within this long duration, so the SR may be canceled.

In the following, the first duration will be further explained.

The first duration is a duration determined according to a scheduling request-prohibit timer (sr-ProhibitTimer) configured by the network device.

For example, the first duration=sr-ProhibitTimer.

The sr-ProhibitTimer is a timer at the terminal device side, the duration of which is configured by the network device. The network device may configure one sr-ProhibitTimer for each SR configuration. As for each SR configuration, after the terminal device sends the SR, it is prohibited to send an SR again within the sr-ProhibitTimer duration.

Optionally, in a case that the network device configures a plurality of sr-ProhibitTimer, the first duration is a duration determined according to a maximum value of the plurality of sr-ProhibitTimer.

For example, the first duration=the maximum value of sr-ProhibitTimer.

The first duration is a duration determined according to the sr-ProhibitTimer and a scheduling request-transmission maximum value (sr-TransMax) configured by the network device.

For example, the first duration=sr-ProhibitTimer*sr-TransMax.

The sr-TransMax is a maximum number of times that the terminal device may repeatedly initiate an SR. The network device may configure one sr-TransMax for each SR configuration. If the terminal device does not receive a response from the network device after the maximum number of times of repeated transmission is exceeded, then it is believed that a beam failure or a link failures occurs.

Optionally, in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

For example, the first duration=the maximum value of sr-ProhibitTimer*the maximum value of sr-TransMax.

In conclusion, in the method for scheduling request process processing provided by the present example, in a case that there is a pending SR, the terminal device receives the PDCCH monitoring adaptive indication sent by the network device, and in a case that the received PDCCH monitoring adaptive indication carries the first indication information, as the first indication information includes the information indicating PDCCH skipping and makes the terminal device believe that the SR is difficult to meet, the terminal device cancels the pending SR, thus avoiding the waste of storage and computing resources of the terminal device are wasted due to unnecessary continuous pending of SRs at the terminal device.

In another possible embodiment, the first indication information includes: information indicating switching to an empty SSSG.

Figure 7:
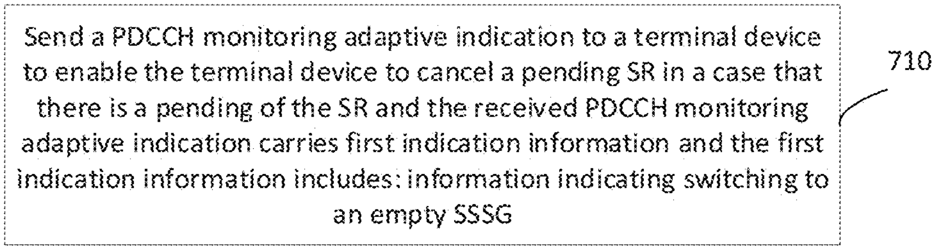
FIG. 7 is a flow diagram of a method for scheduling request process processing according to another example.

FIG. 7 shows a flow diagram of a method for scheduling request process processing provided by an example of the disclosure, which is applied to the network device in the communication system shown in FIG. 1, and the method includes:

step 710: the network device sends a PDCCH monitoring adaptive indication to a terminal device to enable the terminal device to cancel a pending SR in a case that there is a pending of the SR, the received PDCCH monitoring adaptive indication carries first indication information and the first indication information includes: information indicating switching to an empty SSSG.

In some embodiments, the network device may send the PDCCH monitoring adaptive indication to the terminal device. Correspondingly, the terminal device receives the PDCCH monitoring adaptive indication sent by the network device.

The PDCCH monitoring adaptive indication is sent by the network device to the terminal device to indicate information of PDCCH monitoring adjustment.

Optionally, the PDCCH monitoring adaptive indication is carried in scheduling DCI. For example, the scheduling DCI includes a bitfield containing N bits, and the bitfield to indicate the PDCCH monitoring adaptive indication. The scheduling DCI is the DCI used for downlink scheduling.

That is, the PDCCH monitoring adaptive indication is carried in the DCI used for downlink scheduling.

The scheduling DCI is the DCI used for uplink scheduling.

That is, the PDCCH monitoring adaptive indication is carried in the DCI used for uplink scheduling.

For example, the uplink scheduling here cannot meet the transmission requirements of all the pending data to be transmitted corresponding to the SR.

The transmission requirements may include requirements related to the following aspects:

(1) the quantity of the resources allocated by the uplink scheduling is not enough for the transmission of all the pending data to be transmitted; and (2) features of the resources allocated by the uplink scheduling cannot meet the QoS requirements of all the pending data to be transmitted.

For example, some pending data to be transmitted on certain logic channels require a time domain length of a mapped physical layer resource PUSCH of to be 4 time domain symbols at maximum. If the time domain length of a PUSCH allocated by an uplink scheduling is 8 symbols, then the resources allocated by the uplink scheduling cannot fulfill the transmission of pending data on the logic channel.

The information indicating switching to the empty SSSG refers to the information that indicates switching of the terminal device to an SSSG to monitor a search space in the SSSG, the SSSG not containing any search space and being an empty SSSG.

It can be understood that when the terminal device executes a scheduling request process and requests the uplink resources by sending the SR, the SR is in the pending state after the terminal device has sent the SR, and the terminal device needs to monitor PDCCH, i.e., detecting, in a search space, whether the network device sends a PDCCH to the terminal device, to confirm whether the network device responds to the SR. As the terminal device receives the PDCCH monitoring adaptive indication subsequently, and the PDCCH monitoring adaptive indication carries the first indication information and the first indication information includes: the information indicating switching to the empty SSSG, the terminal device will be switched to the empty SSSG not containing any search space based on the first indication information, if the SR continues to be in the pending state, the terminal device cannot confirm whether the network device responds to the SR, thus the terminal device cancels the pending SR.

Optionally, the information indicating switching to the empty SSSG carries a timing value, and the timing value exceeds a first duration, where the timing value is a duration of switching to the empty SSSG.

That is, the timing value of the information indicating switching to the empty SSSG is greater than or equal to (or greater than) the first duration.

For example, the first duration is a time threshold calculated by the terminal device based on the configurations at the network device side. The above configurations may be configurations related to the SR.

If the timing value is less than the first duration, that is, the duration during which the terminal device is switched to the empty SSSG and cannot monitor the PDCCH is short, after the timing value, the terminal device may continue to monitor the DCI used for uplink scheduling. The SR does not need to be canceled within this short timing value.

If the timing value is greater than the first duration, that is, the duration during which the terminal device is switched to the empty SSSG and cannot monitor the PDCCH is long, the terminal device will not be able to obtain the DCI used for uplink scheduling within the timing value, that is, the scheduling request cannot be met within this long time period, so the SR may be canceled.

In the following, the first duration will be further explained.

The first duration is a duration determined according to the sr-ProhibitTimer configured by the network device.

For example, the first duration=sr-ProhibitTimer.

The sr-ProhibitTimer is a timer at the terminal device side, the duration of which is configured by the network device. The network device may configure one sr-ProhibitTimer for each SR configuration. As for each SR configuration, after the terminal device sends the SR, it is prohibited to send an SR again within the sr-ProhibitTimer duration.

Optionally, in a case that the network device configures a plurality of sr-ProhibitTimer, the first duration is a duration determined according to a maximum value of the plurality of sr-ProhibitTimer.

For example, the first duration=the maximum value of sr-ProhibitTimer.

The first duration is a duration determined according to the sr-ProhibitTimer and the sr-TransMax configured by the network device.

For example, the first duration=sr-ProhibitTimer*sr-TransMax.

The sr-TransMax is a maximum number of times that the terminal device may repeatedly initiate an SR. The network device may configure one sr-TransMax for each SR configuration. If the terminal device does not receive a response from the network device after the maximum number of times of repeated transmission is exceeded, then it is believed that a beam failure or a link failure occurs.

Optionally, in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

For example, the first duration=the maximum value of sr-ProhibitTimer*the maximum value of sr-TransMax.

In conclusion, in the method for scheduling request process processing provided by the present example, in a case that there is a pending SR, the terminal device receives the PDCCH monitoring adaptive indication sent by the network device, and in a case that the received PDCCH monitoring adaptive indication carries the first indication information, as the first indication information includes the information indicating switching to the empty SSSG and makes the terminal device believe that the SR is difficult to meet, the terminal device cancels the pending SR, thus avoiding the waste of storage and computing resources of the terminal device are wasted due to unnecessary continuous pending of SRs at the terminal device.

The above examples may be independent examples and may also be implemented in combination, which is not limited in the examples of the disclosure.

The above scheduling request process processing method executed by the terminal device may be independently implemented as a scheduling request process processing method at the terminal device side; and the above scheduling request process processing method executed by the network device may be independently implemented as a scheduling request process processing method at the network device side.

Figure 8:
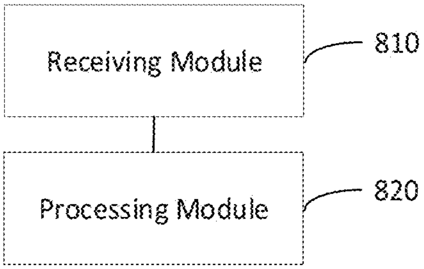
FIG. 8 is a block diagram of an apparatus for scheduling request process processing according to an example.

FIG. 8 shows a block diagram of an apparatus for scheduling request process processing provided by an example of the disclosure, which may be implemented as part or all of a terminal device by means of software, hardware or the combination of the both. The apparatus includes: a receiving module 810 and a processing module 820.

The receiving module 810 is configured to receive a PDCCH monitoring adaptive indication sent by a network device.

The processing module 820 is configured to cancel a pending SR in a case that there is a pending of the SR and the received PDCCH monitoring adaptive indication carries first indication information.

In some examples, the first indication information includes: information indicating PDCCH skipping.

In some examples, the information indicating PDCCH skipping carries a skip duration, and the skip duration exceeds a first duration.

The skip duration is a duration in which a PDCCH is not monitored.

In some examples, the PDCCH contains a Type 3 common search space and a UE-specific search space.

In some examples, the first indication information includes: information indicating switching to an empty SSSG.

In some examples, the information indicating switching to the empty SSSG carries a timing value and the timing value exceeds a first duration.

The timing value is a duration of switching to the empty SSSG.

In some examples, the first duration is a duration determined according to a scheduling request-prohibit timer sr-ProhibitTimer configured by the network device.

In some examples, in a case that the network device configures a plurality of sr-ProhibitTimer, the first duration is a duration determined according to a maximum value of the plurality of sr-ProhibitTimer.

In some examples, the first duration is a duration determined according to the sr-ProhibitTimer and a scheduling request-transmission maximum value sr-TransMax configured by the network device.

In some examples, in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

In some examples, the PDCCH monitoring adaptive indication is carried in the downlink control information DCI used for downlink scheduling.

In some examples, the PDCCH monitoring adaptive indication is carried in the DCI used for uplink scheduling.

In some examples, the uplink scheduling is not able to meet the transmission requirements of all the pending data to be transmitted corresponding to the SR.

Figure 9:
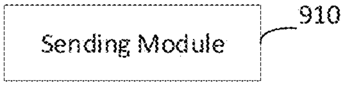
FIG. 9 is a block diagram of an apparatus for scheduling request process processing according to another example.

FIG. 9 shows a block diagram of an apparatus for scheduling request process processing provided by an example of the disclosure. The apparatus may be implemented as part or all of a network device by means of software, hardware or the combination of the both. The apparatus includes: a sending module 910.

The sending module 910 is configured to send a PDCCH monitoring adaptive indication to a terminal device to enable the terminal device to cancel a pending SR in a case that there is a pending of the SR and the received PDCCH monitoring adaptive indication carries first indication information.

In some examples, the first indication information includes: information indicating PDCCH skipping.

In some examples, the information indicating PDCCH skipping carries a skip duration, and the skip duration exceeds a first duration.

The skip duration is a duration in which a PDCCH is not monitored.

In some examples, the PDCCH contains a Type 3 common search space and a UE-specific search space.

In some examples, the first indication information includes: information indicating switching to an empty SSSG.

In some examples, the information indicating switching to the empty SSSG carries a timing value, and the timing value exceeds a first duration.

The timing value is a duration of switching to the empty SSSG.

In some examples, the first duration is a duration determined according to a scheduling request-prohibit timer sr-ProhibitTimer configured by the apparatus.

In some examples, in a case that the apparatus configures a plurality of sr-ProhibitTimer, the first duration is a duration determined according to a maximum value of the plurality of sr-ProhibitTimer.

In some examples, the first duration is a duration determined according to the sr-ProhibitTimer and a scheduling request-transmission maximum value sr-TransMax configured by the apparatus.

In some examples, in a case that the apparatus configures a plurality of sr-ProhibitTimer and a plurality of sr-TransMax, the first duration is a duration determined according to a maximum value among the plurality of sr-ProhibitTimer and a maximum value of the plurality of sr-TransMax.

In some examples, the PDCCH monitoring adaptive indication is carried in the downlink control information DCI used for downlink scheduling.

In some examples, the PDCCH monitoring adaptive indication is carried in the DCI used for uplink scheduling.

In some examples, the uplink scheduling is not able to meet the transmission requirements of all the pending data to be transmitted corresponding to the SR.

Figure 10:
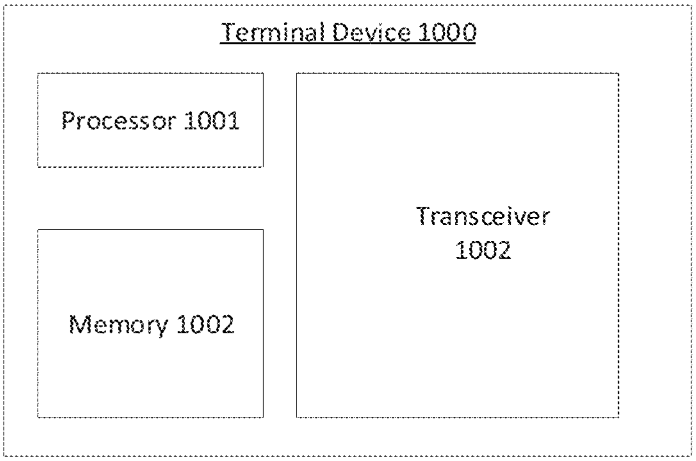
FIG. 10 is a schematic structural diagram of a terminal device according to an example.

FIG. 10 shows a schematic structural diagram of a terminal device provided by an example of the present application. The device 1000 includes: a processor 1001, a transceiver 1002 and a memory 1003.

The processor 1001 includes one or more processing cores, and the processor 1001 executes various functional applications by running software programs and modules.

The transceiver 1002 may be used for receiving and transmitting information, and the transceiver 1002 may be a communication chip.

The memory 1003 may be used for storing computer programs, and the processor 1001 is used for executing the computer programs to implement the various steps executed by the terminal device in the above method examples.

In addition, the memory 1003 may be implemented by any type of volatile or non-volatile storage devices or a combination of the devices, and the volatile or non-volatile storage devices include but are not limited to: a random-access memory (RAM), a read-only memory (ROM), an erasable programmable read-only memory (EPROM), an electrically erasable programmable read-only memory (EEPROM), a flash memory or other solid-state storage technologies, a compact disc read-only memory (CD-ROM), a high-density digital video disc (DVD), or other optical storage, a magnetic cartridge, magnetic tape, a disk storage, or other magnetic storage devices.

Figure 11:
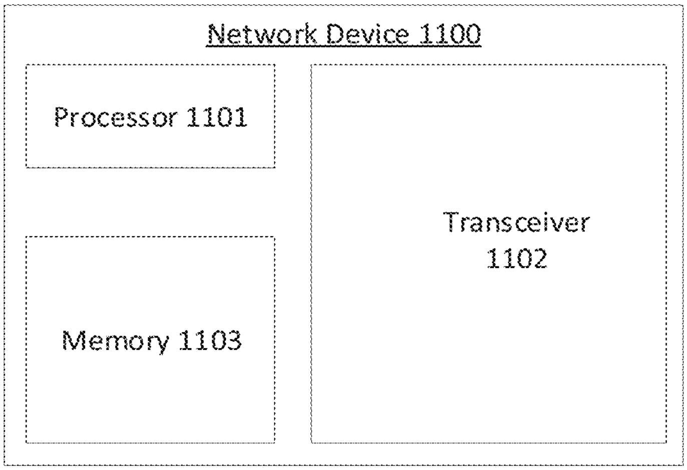
FIG. 11 is a schematic structural diagram of a network device according to another example.

FIG. 11 shows a schematic structural diagram of a network device provided by an example of the present application. The device 1100 includes: a processor 1101, a transceiver 1102 and a memory 1103.

The processor 1101 includes one or more processing cores, and the processor 1101 executes various functional applications by running software programs and modules.

The transceiver 1102 may be used for receiving and transmitting information, and the transceiver 1102 may be a communication chip.

The memory 1103 may be used for storing computer programs, and the processor 1101 is used for executing the computer programs to implement the various steps executed by the network device in the above method examples.

In addition, the memory 1103 may be implemented by any type of volatile or non-volatile storage devices or a combination of the devices, and the volatile or non-volatile storage devices include but are not limited to: a random-access memory (RAM), a read-only memory (ROM), an erasable programmable read-only memory (EPROM), an electrically erasable programmable read-only memory (EEPROM), a flash memory or other solid-state storage technologies, a compact disc read-only memory (CD-ROM), a high-density digital video disc (DVD), or other optical storage, a magnetic cartridge, magnetic tape, a disk storage, or other magnetic storage devices.

An example of the disclosure further provides a non-transitory computer-readable storage medium, the non-transitory computer-readable storage medium stores at least one instruction, at least one program, a code set or an instruction set, and the at least one instruction, the at least one program, the code set or the instruction set is loaded and executed by a processor to implement the scheduling request process processing method provided by the above various method examples.

An example of the disclosure further provides a chip, the chip includes a programmable logic circuit and/or a program instruction, and the chip, when operating, is configured to implement the scheduling request process processing method described in the above aspects.

An example of the disclosure further provides a computer program product, the computer program product includes computer instructions, and the computer instructions are stored in a non-transitory computer-readable storage medium; and a processor of a computer device reads the computer instructions from the non-transitory computer-readable storage medium, and the processor executes the computer instructions to cause the computer device to execute the scheduling request process processing method provided by the above various method examples.

It is to be understood that the terms "system" and "network" here are usually exchangeable here. The term "and/or" here merely describes the association relationship of associated objects, which represents that there may be three relationships, for example, A and/or B may represent that there are three cases: A alone, A and B at the same time, and B alone. In addition, the character "/" here generally represents that the associated objects before and after it are in an "or" relationship. It is also to be understood that the "indication" mentioned in the examples of the disclosure may be a direct indication, an indirect indication, or a representation of an association relationship. For instance, A indicates B, which may represent that A directly indicates B, for example, B may be obtained through A; it may also represent that A indirectly indicates B, for example, A indicates C, and B may be obtained through C; and it may also represent an association relationship between A and B. It is also to be understood that the "correspondence" mentioned in the examples of the disclosure may represent a direct or indirect correspondence relationship between the two, an association relationship between the two, or a relationship of indicating and being indicated, configuring and being configured, etc. It is also to be understood that the "predefined", "protocol agreement", "predetermined" or "predefined rules" mentioned in the examples of the disclosure may be implemented by storing corresponding codes, tables, or other means available to indicate relevant information in devices (such as a network device and a terminal device) in advance, and the disclosure does not limit the specific embodiments. For example, predefined may refer to those defined in a protocol. It is also to be understood that in the examples of the disclosure, the "protocol" may refer to a standard protocol in the communication field, for example, it may include an LTE protocol, an NR protocol, and related protocols applied in future communication systems, which are not limited by the disclosure.

Other embodiment solutions of the disclosure will be apparent to those skilled in the art from consideration of the specification and practice of the disclosure here. The disclosure is intended to cover any variations, uses, or adaptations of the disclosure, and these variations, uses, or adaptations follow the general principles of the disclosure and include such departures from the disclosure as come within known or customary practice in the art. It is intended that the specification and examples be considered as exemplary merely, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of the disclosure. It is intended that the scope of the disclosure is merely limited by the appended claims.

What is claimed is:

1. A method for scheduling request (SR) process processing, wherein the method is executed by a terminal device, and the method comprises:

receiving a physical downlink control channel (PDCCH) monitoring adaptive indication sent by a network device; and canceling a pending SR in a case that there is a pending of the SR and the received PDCCH monitoring adaptive indication carries first indication information, wherein the first indication information comprises: information indicating switching to an empty search space set group (SSSG), the information indicating switching to the empty SSSG carries a timing value, and the timing value exceeds a first duration, the timing value is a duration of switching to the empty SSSG, the first duration is a duration determined according to a scheduling request-prohibit timer sr-ProhibitTimer configured by the network device, or a sr-ProhibitTimer and a scheduling request-transmission maximum value sr-TransMax configured by the network device, and in a case that the network device configures a plurality of sr-ProhibitTimer, the first duration is a duration determined according to a maximum value of the plurality of sr-ProhibitTimer, or in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

2. The method of claim 1, wherein the first indication information comprises: information indicating PDCCH skipping.

3. The method of claim 2, wherein the information indicating PDCCH skipping carries a skip duration, and the skip duration exceeds a first duration; wherein the skip duration is a duration in which a PDCCH is not monitored.

4. The method of claim 3, wherein the PDCCH contains a Type 3 common search space and a UE-specific search space.

5. The method of claim 3, wherein the first duration is a duration determined according to a scheduling request-prohibit timer sr-ProhibitTimer configured by the network device, or a sr-ProhibitTimer and a scheduling request-transmission maximum value sr-TransMax configured by the network device.

6. The method of claim 5, wherein in a case that the network device configures a plurality of sr-ProhibitTimer, the first duration is a duration determined according to a maximum value of the plurality of sr-ProhibitTimer, or in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

7. The method of claim 1, wherein the PDCCH monitoring adaptive indication is carried in downlink control information (DCI) used for downlink scheduling.

8. The method of claim 1, wherein the PDCCH monitoring adaptive indication is carried in downlink control information (DCI) used for uplink scheduling.

9. The method of claim 8, wherein the uplink scheduling is not able to meet transmission requirements of all the pending data to be transmitted corresponding to the SR.

10. A non-transitory computer-readable storage medium, wherein the non-transitory computer-readable storage medium stores at least one instruction, at least one program, a code set or an instruction set, and the at least one instruction, the at least one program, the code set or the instruction set is loaded and executed by a processor to implement the method for SR process processing of claim 1.

11. A method for scheduling request (SR) process processing, wherein the method is executed by a network device, and the method comprises:

sending a physical downlink control channel (PDCCH) monitoring adaptive indication to a terminal device to enable the terminal device to cancel a pending SR in a case that there is a pending of the SR and the PDCCH monitoring adaptive indication carries first indication information, wherein the first indication information comprises: information indicating switching to an empty search space set group (SSSG), the information indicating switching to the empty SSSG carries a timing value, and the timing value exceeds a first duration, the timing value is a duration of switching to the empty SSSG, the first duration is a duration determined according to a scheduling request-prohibit timer sr-ProhibitTimer configured by the network device, or a sr-ProhibitTimer and a scheduling request-transmission maximum value sr-TransMax configured by the network device, and in a case that the network device configures a plurality of sr-ProhibitTimer, the first duration is a duration determined according to a maximum value of the plurality of sr-ProhibitTimer, or in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

12. The method of claim 11, wherein the first indication information comprises: information indicating PDCCH skipping.

13. A network device, comprising:

a processor; and a transceiver connected with the processor; wherein the processor is configured to load and execute executable instructions to implement the method for SR process processing of claim 11.

14. A non-transitory computer-readable storage medium, wherein the non-transitory computer-readable storage medium stores at least one instruction, at least one program, a code set or an instruction set, and the at least one instruction, the at least one program, the code set or the instruction set is loaded and executed by a processor to implement the method for SR process processing of claim 11.

15. A terminal device, comprising:

a processor; and a transceiver connected with the processor; wherein the processor is configured to load and execute executable instructions to implement the method for scheduling request process processing, comprising receiving a physical downlink control channel (PDCCH) monitoring adaptive indication sent by a network device; and cancelling a pending scheduling request (SR) in a case that there is a pending of the SR and the received PDCCH monitoring adaptive indication carries first indication information, wherein the first indication information comprises: information indicating switching to an empty search space set group (SSSG), the information indicating switching to the empty SSSG carries a timing value, and the timing value exceeds a first duration, the timing value is a duration of switching to the empty SSSG, the first duration is a duration determined according to a scheduling request-prohibit timer sr-ProhibitTimer configured by the network device, or a sr-ProhibitTimer and a scheduling request-transmission maximum value sr-TransMax configured by the network device, and in a case that the network device configures a plurality of sr-ProhibitTimer, the first duration is a duration determined according to a maximum value of the plurality of sr-ProhibitTimer, or in a case that the network device configures a plurality of sr-ProhibitTimer and a plurality of sr-TransMax, the first duration is a duration determined according to a maximum value of the plurality of sr-ProhibitTimer and a maximum value of the plurality of sr-TransMax.

* * * * *